(12) United States Patent
Baker et al.

(10) Patent No.: US 10,143,892 B2
(45) Date of Patent: Dec. 4, 2018

(54) CAM STEM SYSTEM

(71) Applicants: Alex Baker, Salt Lake City, UT (US);
Pete Gompert, Huntsville, UT (US);
Bill Belcourt, Salt Lake City, UT (US)

(72) Inventors: Alex Baker, Salt Lake City, UT (US);
Pete Gompert, Huntsville, UT (US);
Bill Belcourt, Salt Lake City, UT (US)

(73) Assignee: Black Diamond Equipment, Ltd., Salt Lake City, UT (US)

( * ) Notice: Subject to any disclaimer, the term of this patent is extended or adjusted under 35 U.S.C. 154(b) by 0 days.

(21) Appl. No.: 14/616,676

(22) Filed: Feb. 7, 2015

(65) Prior Publication Data

US 2015/0290499 A1    Oct. 15, 2015

Related U.S. Application Data

(60) Provisional application No. 61/978,848, filed on Apr. 12, 2014.

(51) Int. Cl.
*A63B 29/00* (2006.01)
*A63B 29/02* (2006.01)
*A45F 5/00* (2006.01)
*F16B 2/04* (2006.01)
*F16B 2/18* (2006.01)
(Continued)

(52) U.S. Cl.
CPC ............ *A63B 29/024* (2013.01); *A45F 5/004* (2013.01); *F16B 2/04* (2013.01); *F16B 2/18* (2013.01); *H04B 1/385* (2013.01); *H04B 1/3888* (2013.01); *A45F 2005/006* (2013.01); *A45F 2200/0516* (2013.01); *H04B 2001/3866* (2013.01)

(58) Field of Classification Search
CPC ......... A63B 29/02; A63B 29/024; F16B 2/04; F16B 2/18; Y10S 248/925; A45F 5/004
USPC .......................................... 248/925, 231.31
See application file for complete search history.

(56) References Cited

U.S. PATENT DOCUMENTS 3,946,975 A * 3/1976 Lyman, Jr. ........... A63B 29/024
                                                           248/317
4,184,657 A * 1/1980 Jardine ................ A63B 29/024
                                                           248/231.9
(Continued)

FOREIGN PATENT DOCUMENTS

| CA | 2537289 | 8/2006 | |
|---|---|---|---|
| EP | 02226829 | 7/1987 | |
| EP | 0226829 B1 * | 8/1989 | ........... A63B 29/024 |

*Primary Examiner* — Eret C McNichols
(74) *Attorney, Agent, or Firm* — Trent Baker; Baker & Associates PLLC

(57) ABSTRACT

One embodiment of the present invention relates to an improved camming stem system including a head member, a plurality of cam lobes, a connection system, and a retraction system. The cam lobes may be selectively rotatable between an extended state and a retracted state with respect to at least one axle of the head member. The connection system may create an elongated, substantially rigid region by intercoupling the head member with a loop. The connection system includes a cord continuously wrapped around the head member and loop. The continuous configuration of the cord around both the head member and the loop creates the necessary minimum tensile strength for operation of the camming system. The cord may be wrapped around a rivet or one or more axles of the head member. Independent regions of the cord may be spliced together to form the continuous configuration.

15 Claims, 8 Drawing Sheets

(51) Int. Cl.
*H04B 1/3888* (2015.01)
*H04B 1/3827* (2015.01)

(56) References Cited

U.S. PATENT DOCUMENTS

| | | | | |
|---|---|---|---|---|
| 4,586,686 A * | 5/1986 | Cason | ................... | A63B 29/024 248/231.9 |
| 4,643,377 A * | 2/1987 | Christianson | ........ | A63B 29/024 248/231.9 |
| 4,645,149 A * | 2/1987 | Lowe | ................... | A63B 29/024 248/231.9 |
| 4,712,754 A * | 12/1987 | Brodie | ................. | A63B 29/024 248/200 |
| 4,781,346 A * | 11/1988 | Banner | ................ | A63B 29/024 248/231.9 |
| 4,832,289 A * | 5/1989 | Waggoner | ............ | A63B 29/024 248/231.9 |
| RE33,104 E * | 10/1989 | Taylor | ................... | A63B 29/024 248/231.85 |
| 5,860,629 A * | 1/1999 | Reed | .................... | A63B 29/024 248/231.9 |
| 6,283,426 B1 * | 9/2001 | Guthrie | ................ | A63B 29/024 248/231.21 |
| 6,679,466 B2 * | 1/2004 | Brown | ................ | A63B 29/024 248/231.9 |
| 6,736,359 B2 * | 5/2004 | Murray | ................ | A63B 29/024 248/231.9 |
| 7,040,588 B2 * | 5/2006 | Lowe | ................... | A63B 29/024 182/9 |
| 7,278,618 B2 * | 10/2007 | Tusting | ................ | A63B 29/024 182/3 |
| 7,743,885 B2 | 6/2010 | Martin et al. | | |
| 7,959,119 B2 * | 6/2011 | Tusting | ................ | A63B 29/024 248/231.9 |
| 8,317,145 B2 * | 11/2012 | Reed | .................... | A63B 29/024 248/231.9 |
| 9,079,065 B2 * | 7/2015 | Perkins | ................ | A63B 29/024 |
| 9,302,154 B2 * | 4/2016 | Steck | ................... | A63B 29/024 |
| 2004/0035992 A1 | 2/2004 | Watts | | |
| 2005/0037023 A1 * | 2/2005 | Field, Jr. | ................ | A63B 29/024 424/195.15 |
| 2005/0218282 A1 * | 10/2005 | Phillips | ................ | A63B 29/024 248/231.9 |
| 2015/0001360 A1 * | 1/2015 | Czech | ................. | A63B 29/024 248/231.9 |

* cited by examiner

CAM STEM SYSTEM

RELATED APPLICATIONS

This application claims priority to U.S. provisional application Ser. No. 61/978,848 filed Apr. 12, 2104 the contents of which are incorporated by reference.

FIELD OF THE INVENTION

The invention generally relates to active camming systems. In particular, the present invention relates to an improved camming stem system.

BACKGROUND OF THE INVENTION

Climbers generally use clean protection devices for two distinct purposes. First, a clean protection device may be used as a form of safety protection for protecting a climber in the event of a fall, and second, a clean protection device may intentionally be used to artificially support a climber's weight. Clean protection devices cam or wedge into a crack, hole, gap, orifice, taper, or recess in order to support an outward force. The surface on which the clean protection device supports the outward force is considered the protection surface. The protection surface can consist of natural materials such as rock or may consist of artificial materials such as concrete or wood.

Clean protection devices are generally divided into categories of active and passive. Passive protection devices include a single object which contacts the protection surface to support an outward force. For example, a wedge is a passive protection device because it has a single head with a fixed shape. There are numerous types of passive protection devices including nuts, hexes, tri-cams, wedges, rocks, and chocks. Active protection devices include at least two movable parts that can move relative to one another to create a variety of shapes. For example, a slidable chock or slider nut is considered an active protection device because it includes two wedges that move relative to one another to wedge into various shaped crevices. When the two wedges of the slider nut are positioned adjacent to one another, the overall width of the protection device is significantly larger than if the two wedges are positioned on top of one another. The two wedges must make contact with the protection surface in order to actively wedge the device within the protection surface. A further subset of active protection is camming devices. These devices translate rotational displacement into linear displacement. Therefore, a slider chock would not be an active camming device because the two wedges simply slide relative to one another and do not rotate. Camming devices may include two, three, and four cam lobes. The cam lobes on an active camming device are generally spring biased into an expanded position and are able to rotate or pivot about an axle to retract. In operation, at least one cam lobe on either side of the unit must make contact with the protection surface for the device to be able to actively support an outward force. Some active protection devices can also be used passively to support outward forces as well.

Unfortunately, the largest disadvantage of active protection devices is their considerable weight in relation to passive protection devices. One of the heavier components of an active protection device is the connection system or stem. The connection system connects the camming objects to some form of clip-in point or loop. The two most common connection systems used in three and four lobe cam units are single stem and double stem systems. Double stem systems include a U-shaped cable that attaches independently to two cable terminals on either end of the head of the protection device. The clip-in point of a double stem system is simply the bottom of the U-shaped cable. Single stem systems include a single cable that is attached to a single cable terminal located at the center of the head of the protection device. The single stem system generally includes some form of clip-in loop attached to the single cable. Alternatively, a clip-in loop can be created by coupling the single cable back to itself with some form of swage. Single stem connection systems are generally preferable for larger cams because they are less likely to obstruct the placement of the camming device.

Therefore, there is a need in the industry for active camming stem systems that reduce the overall weight of the system while maintaining the necessary strength and flexibility for optimal use.

SUMMARY OF THE INVENTION

The present invention relates to active camming systems. One embodiment of the present invention relates to an improved camming stem system including a head member, a plurality of cam lobes, a connection system, and a retraction system. The cam lobes may be selectively rotatable between an extended state and a retracted state with respect to at least one axle of the head member. The connection system may create an elongated, substantially rigid region by intercoupling the head member with a loop. The connection system includes a cord continuously wrapped around the head member and loop. The continuous configuration of the cord around both the head member and the loop creates the necessary minimum tensile strength for operation of the camming system. The cord may be wrapped around a rivet or one or more axles of the head member. Independent regions of the cord may be spliced together to form the continuous configuration. A second embodiment of the present invention relates to a method for manufacturing an active camming system. The method includes acts of wrapping a cord around the head member; extending the cord through a stem member to form the elongated partially rigid region; extending the cord through a U-shaped member to form a loop; and splicing two regions of the cord to form a continuous loop.

Embodiments of the present invention represent a significant advancement in the field of active camming systems. The connection system of conventional camming systems includes one or more metal cables swaged between the head member and the loop. In order to facilitate the swage coupling, the head member of conventional camming systems must include a metal terminal for intercoupling the axles with the connection system. These metal terminal and metal cables add significant weight to the system. Embodiments of the present invention incorporate the novel use of a cord in a continuous configuration wrapped around both the axle(s) and the loop. A piece of cord may be spliced together at the ends to form a continuous loop configuration. The elimination of a metal terminal and metal cable significantly reduces the overall weight of the system while maintaining the minimum tensile strength.

These and other features and advantages of the present invention will be set forth or will become more fully apparent in the description that follows and in the appended claims. The features and advantages may be realized and obtained by means of the instruments and combinations particularly pointed out in the appended claims. Further-more, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to active camming systems. One embodiment of the present invention relates to an improved camming stem system including a head member, a plurality of cam lobes, a connection system, and a retraction system. The cam lobes may be selectively rotatable between an extended state and a retracted state with respect to at least one axle of the head member. The connection system may create an elongated, substantially rigid region by intercoupling the head member with a loop. The connection system includes a cord continuously wrapped around the head member and loop. The continuous configuration of the cord around both the head member and the loop creates the necessary minimum tensile strength for operation of the camming system. The cord may be wrapped around a rivet or one or more axles of the head member. Independent regions of the cord may be spliced together to form the continuous configuration. Also, while embodiments are described in reference to an active camming system, it will be appreciated that the teachings of the present invention are applicable to other areas including but not limited to passive camming systems.

The following terms are defined as follows:

Braiding—a type of coupling in which individual fibers are substantially parallel and interwoven around one another.

Weaving—a type of coupling in which an orthogonal fiber is interwoven between a set of substantially parallel fibers.

Cord—an elongated member comprising a set of at least three braided fibers. For example, DYNEEMA is a type of braided cord.

Cable—an elongated member comprising a single strand or a plurality of twisted non-braided strands.

Webbing—an elongated member comprising a plurality of woven fibers.

Splice—a type of coupling between one end of a cord and another portion of a cord. A splice includes braiding the end of the cord with either another end region or a middle region.

Continuous loop—a loop containing no end region. For example, a rubber band forms a mathematically continuous loop of rubber because there is no end region.

Figure 1:
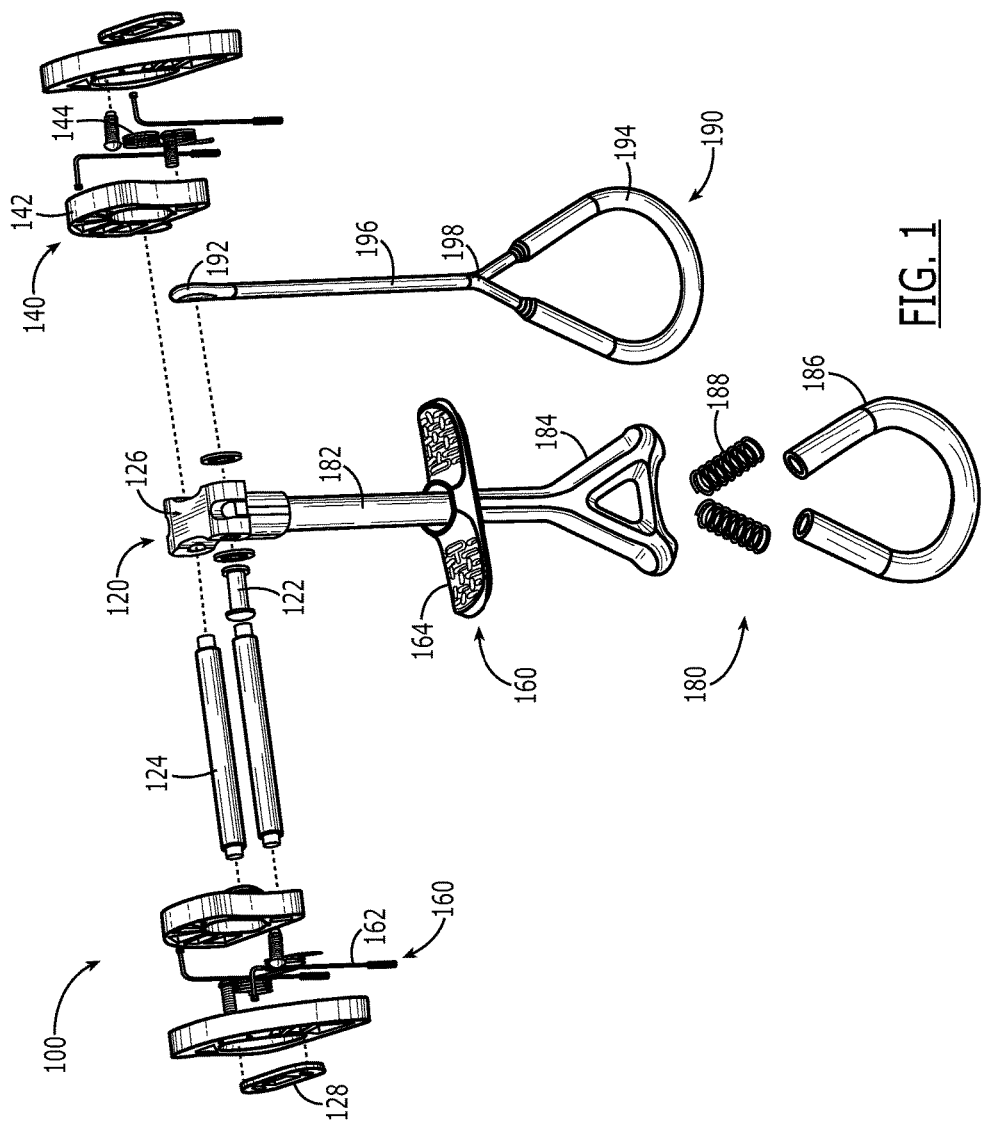
FIG. 1 illustrates an exploded perspective view of the active camming system in accordance with embodiments of the present invention.
Figure 8:
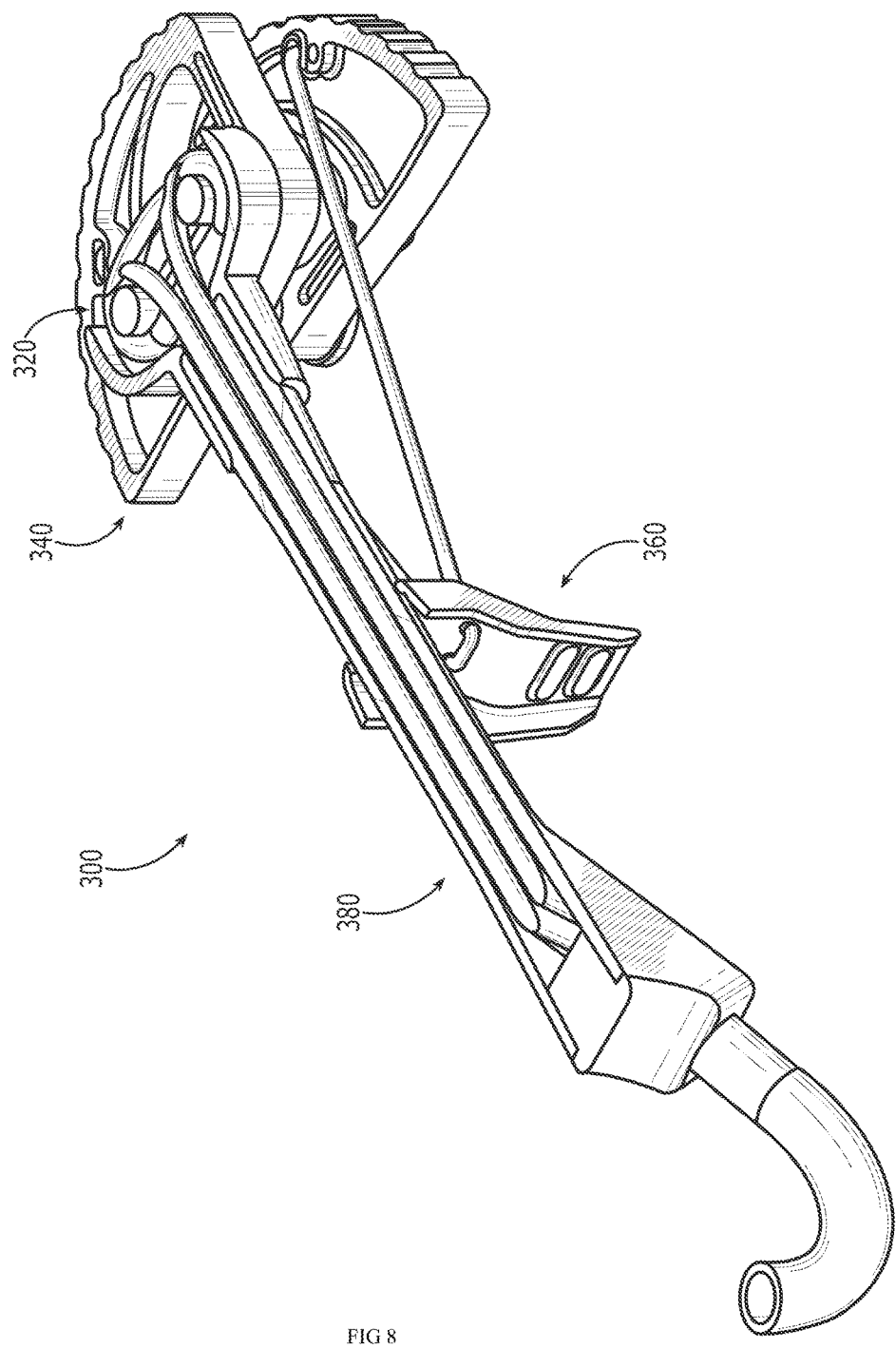
FIG. 8 illustrates a lengthwise cross-sectional perspective view of an alternative active camming system with an alternative head member configuration.

Reference is initially made to FIG. 1 which illustrates an active camming system designated generally at 100. The system includes a head member 120, cam lobes 140, a retraction system 160, and a connection system 180. The head member 120 further includes a rivet 122, a first and second axle 124, a head 126, and a set of plates or axles separators 128. Non-illustrated alternative embodiments may incorporate a single axle without a plate separator. The axles 124 are cylindrical members which facilitate the rotation of the cam lobes 140 between extended and retracted states. The included Figures all illustrate the cam lobes 140 in the extended state but it will be appreciated by one skilled in the art that the cam lobes 140 are configured to rotate/pivot about the axles to a retracted state. The axles 124 may comprise a rigid metal material configured to withstand particular forces. The plates 128 rigidly intercouple the end regions of the axles 124 so as to create a particular spacing therebetween. The plates 128 are disposed on either side of the head member 120. The plates 128 may be composed of aluminum and shaped in an oval configuration. The rivet 122 is an optional substantially cylindrical member extending through an internal region of the head 126 to facilitate a coupling with the connection system and cord 190 described below. Various alternative coupling configurations may be utilized including but not limited to bolts, pins, and/or rivet orientations. The rivet 122 may be substantially parallel to the axles 124 and offset lengthwise. For example, if the axles are disposed in the outer T portions of the head 126, the rivet 122 may be disposed in the lower region respectively. Various alternative axle and rivet configurations may be utilized for specific purposes such as alternative materials, cam lobe spacing, torsional strength, etc. FIG. 8 illustrates an alternative head member 120 configuration without a rivet 122. The head 126 is configured to at least partially cover a coupling region of the axles 124 between the cam lobes 140 and resist translation and rotation of the axles 124. The coupling region of the axles 124 is aligned with the rivet 122. The head 126 may be substantially T-shaped and composed of a rigid plastic or metal material.

The cam lobes 140 include independent lobes 142 and biasing springs 144. It will be appreciated that alternative embodiments may include other lobe configurations, including but not limited to two or three lobe systems. The lobes 142 are rotatable coupled to the axles 124 to facilitate rotation between the extended and retracted states (i.e. axis of rotation). The cam lobes 142 are each substantially quarter pie-shaped with a curved camming surface and configured to rotate about a rotation point mathematically corresponding to the shape of the curved camming surface. The cam lobes 142 may be composed of a metal material including but not limited to aluminum and may incorporate various internal recesses, depressions, etc. The cam lobes 142 are biased in the extended state with respect to the axles with the biasing springs 144. The biasing springs 144 are intercoupled between the cam lobes 142 and the axles 124.

The retraction system 160 is coupled between the connection system 180 and the cam lobes 140 and is configured to enable the selective engagement of the retracted state. The retraction system includes a trigger 164 and a plurality of trigger wires 162. The trigger 164 is slidably coupled over the elongated, partially rigid region of the connection system 180. The trigger 164 is shaped to include two finger regions orthogonally extending from the elongated region of the connection system 180. The trigger 164 may be composed of a rigid plastic material. The trigger wires 162 are coupled between the trigger 164 and the individual cam lobes 142 (not shown). The trigger wires 162 may be metal wires coupled to recesses in both the trigger 164 and cam lobes 142. The trigger 164 is configured to slide along the elongated region of the connection system 180 corresponding to the extended and retracted states of the cam lobes 140. In operation, a user may retract the trigger 164 away from the head member 120 to overcome the biasing force of the cam lobes 140 toward the extended state. As the user continues to retract the trigger 164, the cam lobes 142 rotate about the axles 124 toward the retracted state (not shown).

The novel connection system 180 includes a cord 190, a stem member 182, a cover member 184, and a U-shaped member 186. The cord 190 further includes a rivet loop 192, a stem region 196, a twist 198, and a base 194. The cord 190 forms a continuous loop of braided material including at least one splice coupling. The term continuous loop refers to a mathematically continuous shape that does not substantially include any points of discontinuousness. The term braided refers to at least three interwoven fibers forming the cord. The term splice coupling refers to a type of coupling in which the individual fibers from independent regions of the cord are braided with one another. End regions of a cord may be spliced together to form a continuous coupling with minimal cross-sectional volume. Alternatively, the two ends may also be medially spliced at independent regions to form a non-loop continuous configuration that includes two looped regions separated by a single region. Various splicing techniques may be used including but not limited interweaving sub-strands of the two ends of the cord within one another. The splicing technique may be combined with one or more sleeves to circumferentially compress the splice, protect the splice, and/or avoid expansion. The splicing technique may be described as analogous in function to the commonly known toy called a "finger torture" device in that the interwoven splicing pattern is configured to bind against one another strengthening the coupling in response to tensile expansion forces. The cord may be any type of interwoven fiber such as a DYNEEMA brand cord. In contrast to a single strand cable, a cord has the ability to articulate at a greater angle while maintaining structural integrity. This feature enables the cord to be wrapped around the rivet 122 or axles 124 rather than intercoupled via some form of terminal member.

The components of the cord 190 and connection system 180 function synergistically to provide the structural integrity and flexibility for optimal operation of the connection system 160. Although the cord 190 includes the necessary tensile integrity for the connection system 160, it alone would be vulnerable to abrasion and lack sufficient lengthwise rigidity. Therefore, the novel embodiments of the present invention combine the cord 190 within the stem member 182, cover member 184, and U-shaped member 186 to protect the cord 190 and provide the necessary lengthwise rigidity. The rivet loop 192 wraps around the rivet 122 within an internal partially enclosed region of the head member 120. The assembly of the system 100 may include positioning the rivet loop 192 within an internal region of the head member 120; extending the rivet 122 through the internal portion of the rivet loop 192; and coupling either end of the rivet 122 to the exterior of the head member 120. The stem region 196 of the cord 190 may include a single or double portion depending on the splicing configuration of the cord 190. For example, if the cord 190 includes a single splice (i.e. forms one big loop), the stem region 196 may include two parallel portions of the cord 190. The stem region 196 is an elongated straight region of the cord 190 disposed within the stem member 182 of the connection system 160. The stem member 182 is a hollow elongated member having an internal channel corresponding to the diameter of the stem region 196. The stem member 182 may be cylindrically shaped and have a lengthwise rigidity greater than the stem region 196 of the cord 190. The stem member 182 is flexibly biased toward a straight configuration. The stem member 182 forms the surface or track along which the trigger 164 of the retraction system 160 translates. The twist 198 of the cord 190 is a transition region from the stem region 196 to the base 194. In a multiple splice configuration, the twist 198 and the rivet loop 192 may each include a splice coupling of the cord. The twist 198 and a portion of the base 194 of the cord 190 are disposed within the cover member 184. The cover member 184 includes a substantially Y-shaped or V-shaped internal channel in which two portions are separated. The transition from the twist 198 to the base 194 is disposed within the cover member 184 internal channel. The remainder of the base 194 is disposed within the U-shaped member 186. The U-shaped member 186 and the base 194 form a lower loop lengthwise opposite to the head member 120 which may act as a clip in loop. The connection system 180 may allow the loop to be flexible and compressible but biases the loop toward the illustrated open configuration. The U-shaped member 186 may be cylindrically shaped and include an internal channel corresponding to the exterior diameter of the base 194 of the cord 190. The U-shaped member comprises a flexible material which may have a rigidity greater than the base 194 of the cord 190. A set of springs 188 may be disposed over a portion of the cord 190 and within the internal region of the cover member 184 and/or the U-shaped member 186. The springs 188 may provide additional biasing and support which further protects the integrity of the cord 190 in certain applications.

Figure 2:
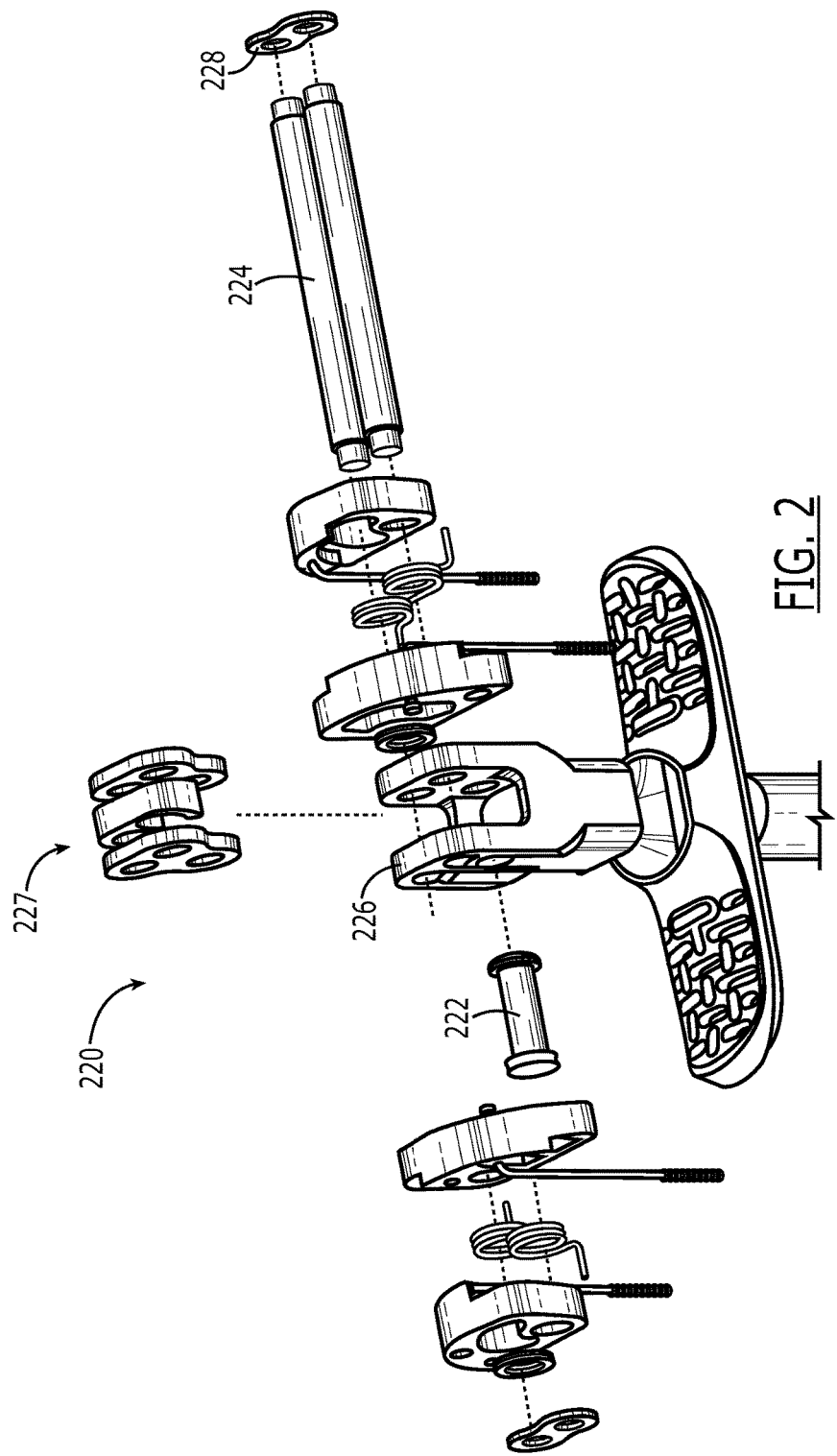
FIG. 2 illustrates an exploded perspective view of an alternative head member in accordance with embodiments of the present invention.

Reference is next made to FIG. 2 which illustrates an exploded view of an alternative head member designated generally at 220. The head member 220 includes a rivet 222, set of axles 224, head 226, set of head inserts 227, and plates 228. The alternative separation of the head 226 and head inserts 227 allows for multiple materials to be utilized in the head member 120 to provide optimal size, weight, and structural parameters. For example, the illustrated alternative head member 220 embodiment of FIG. 2 may be particularly suited to smaller active camming system in contrast the to head member 120 configuration illustrated in FIG. 1.

Figure 3:
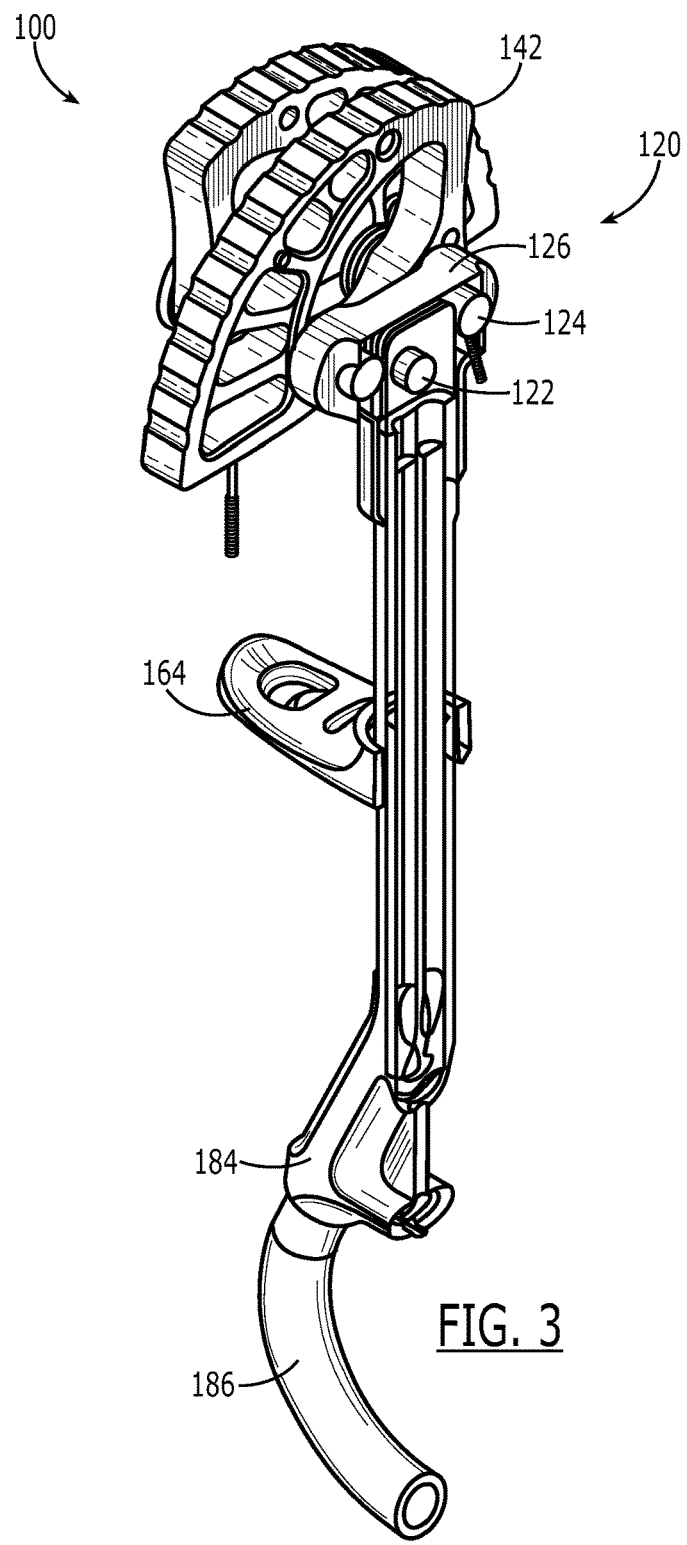
FIG. 3 illustrates a lengthwise cross-sectional perspective view of the active camming system of FIG. 1.
Figure 4:
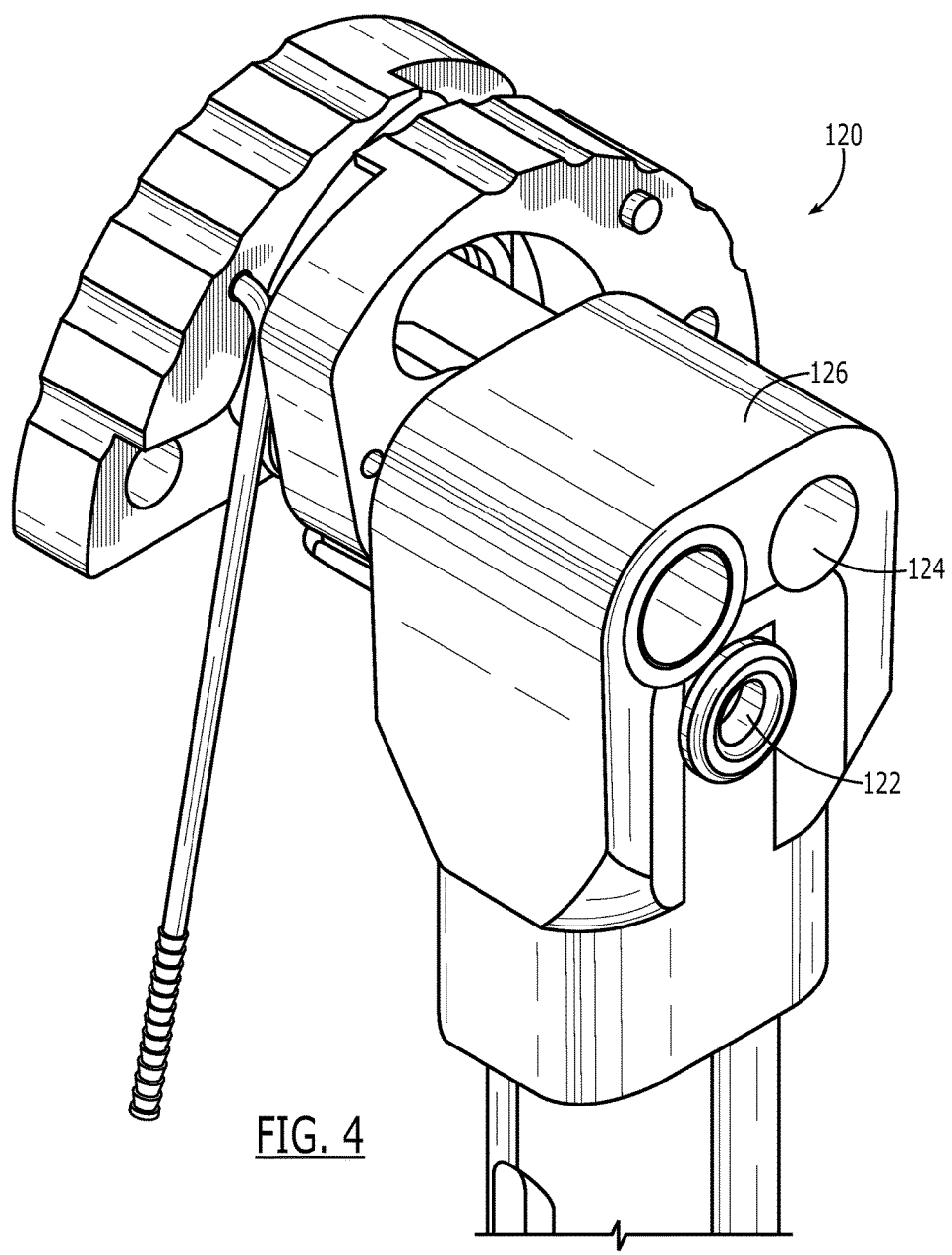
FIG. 4 illustrates a orthogonal cross-sectional perspective view of the head member of the active camming system of FIG. 1
Figure 5:
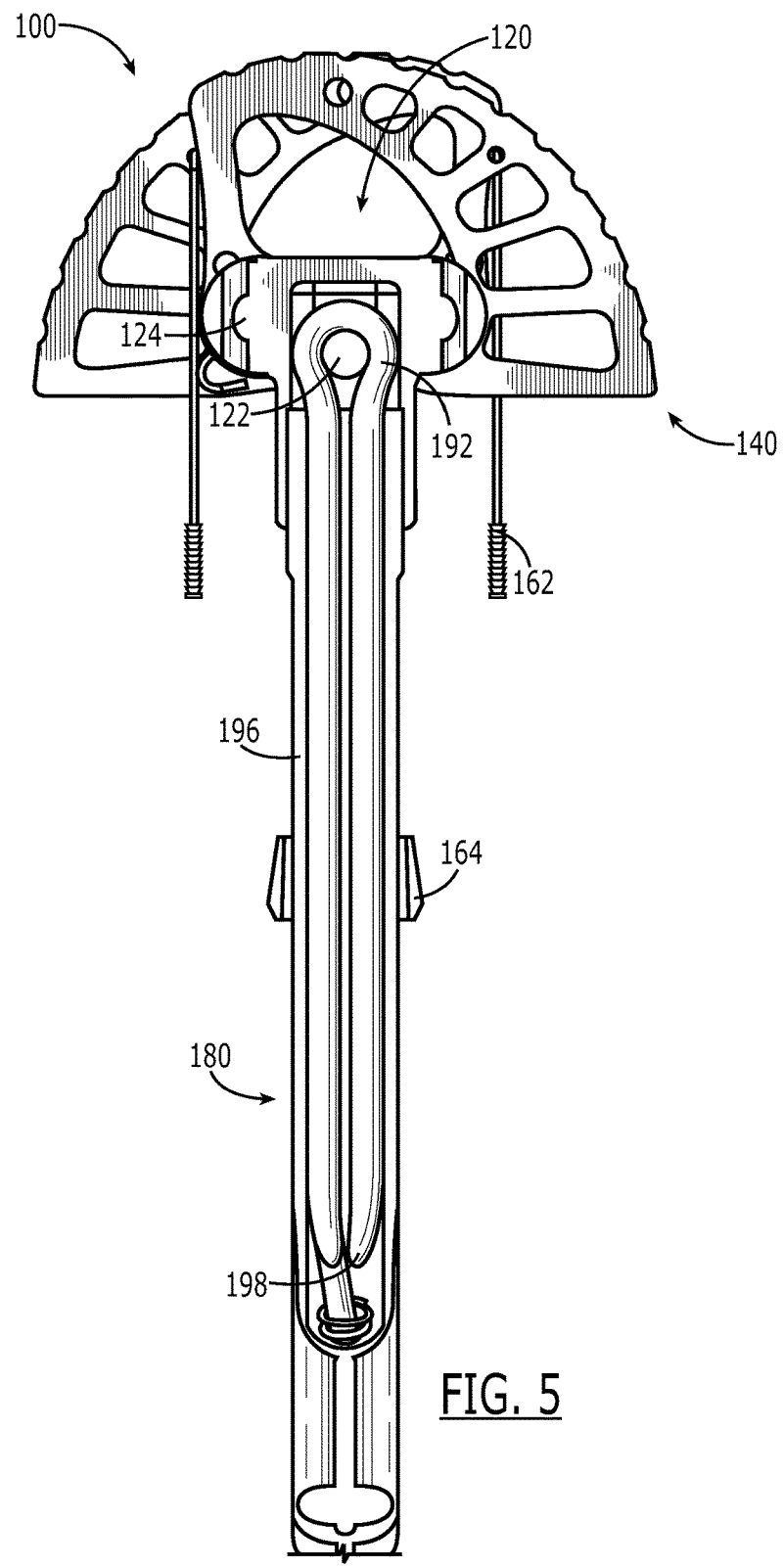
FIG. 5 illustrates a transparent profile view of the active camming system of FIG. 1.

Reference is next made to FIGS. 3-6, which illustrate various cross sectional and transparent views of the system 100 illustrated in FIG. 1. FIG. 3 illustrates an assembled system 100 with a lengthwise cross section parallel to the axis of rotation of the cam lobes 142. FIG. 4 illustrates a head member 120 detailed view with a cross section parallel to the axis of rotation of the cam lobes 142. FIG. 5 illustrates an assembled profile transparent view of the system 100.

Figure 6:
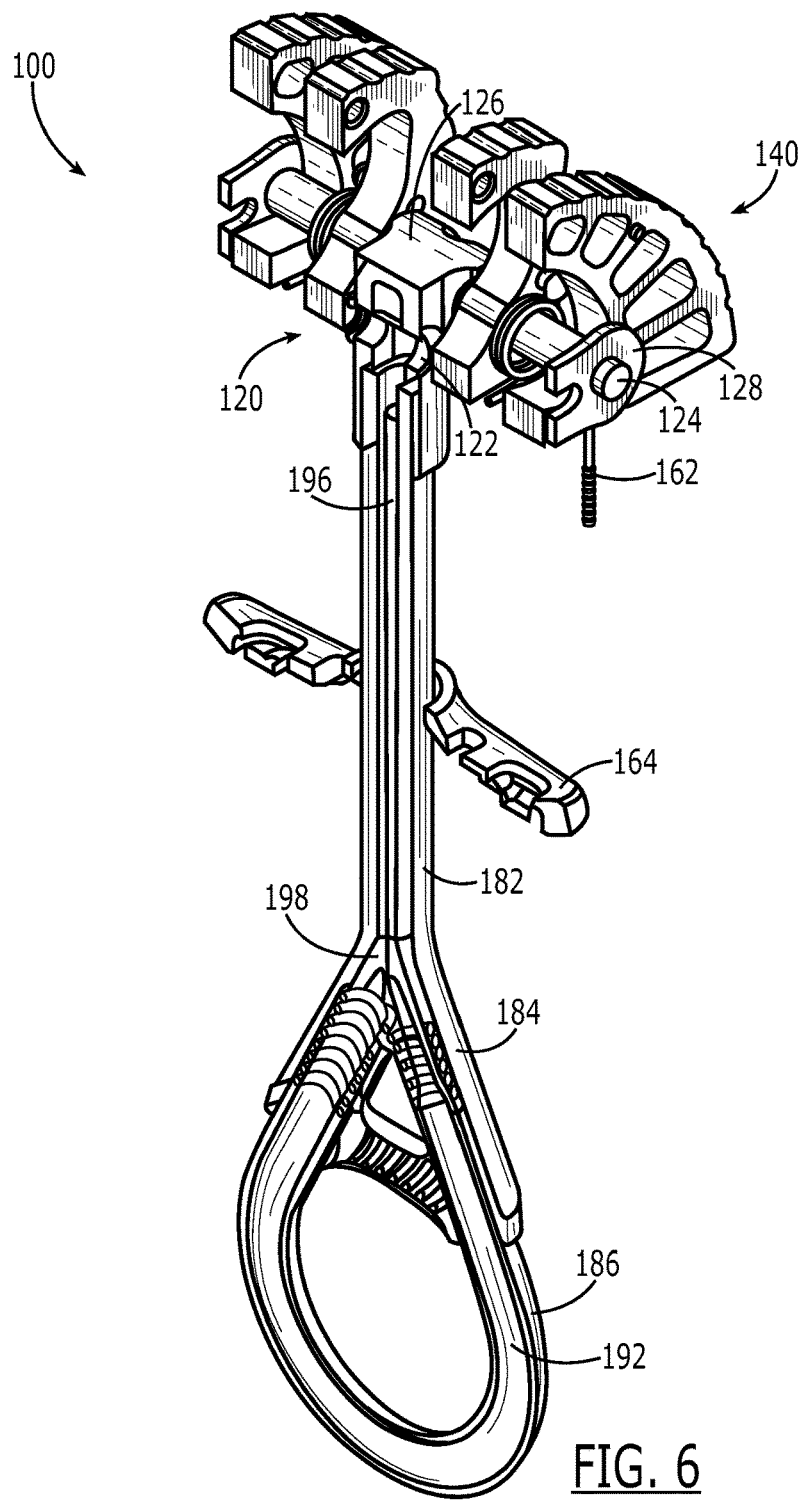
FIG. 6 illustrates an alternative lengthwise cross-sectional perspective view of the active camming system of FIG. 1.
Figure 7B:
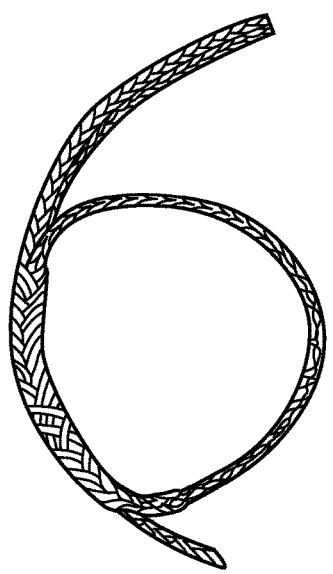
FIG. 7A-D illustrate one embodiment of creating a continuous cord loop including splicing independent regions of the cord together.
Figure 7D:
Figure 7A:
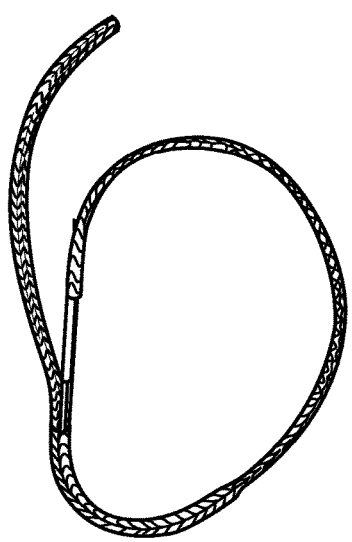
Figure 7C:
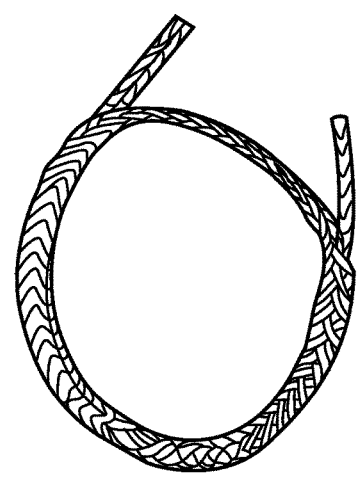

FIG. 6 illustrates an assembled system 100 with a lengthwise cross section orthogonal to the axis of rotation of the cam lobes 142.

References is next made to FIGS. 7A-7D which illustrate one embodiment of a cord splicing process. In particular FIGS. 7A-7D illustrate sequentially splicing the end regions of a cord to form a continuous loop. The splice includes braiding fibers from one region with a separate region. As discussed above, braiding includes routing the fibers around one another in a substantially parallel configuration. The braiding process may include completely braising the end regions within the cord to avoid fraying. The splice coupling configuration causes a tightening or binding in response to a separating or tensile force. In addition, an optional compression cover may be positioned over the cord to further prevent the braided cords from separating and/or protect from abrasion.

Reference is next made to FIG. 8 which illustrated an alternative active camming system, designated generally 300. The system 300 includes a head member 320, cam lobes 340, retraction system 360, and connection system 380. The system 300 includes an alternative cord head member intercoupling configuration in which the cord is wrapped around the axles rather than a rivet (FIGS. 1-6).

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. An active camming device system comprising:
   a head member comprising at least one axle and a rivet, wherein the rivet is physically independent from the at least one axle;
   a plurality of cam lobes rotatably coupled to the at least one axle, wherein the plurality of cam lobes are rotatable between an extended state and a retracted state with respect to the at least one axle, and wherein the cam lobes are spring biased toward the extended state;
   a retraction system configured to selectively engage the retracted state, wherein the retraction system includes fixably coupling the plurality of cam lobes with a trigger, and wherein the trigger is slidably externally coupled to the connection system; and
   a connection system configured to create an elongated partially rigid region by intercoupling the head member with a loop, wherein the connection system comprises a continuous cord wrapped directly around the rivet but not the at least one axle of the head member and the loop, wherein the elongated partially rigid region includes a rigidity greater than the continuous cord.

2. The system of claim 1, wherein the continuous cord includes at least one spliced coupling between two regions of the continuous cord, and wherein the spliced coupling includes braiding a set of fibers of each of the two regions with one another.

3. The system of claim 1, wherein the continuous cord extends through a stem member, a cover member, and within a U-shaped member to form the elongated partially rigid region.

4. The system of claim 3, wherein the stem member, cover member, and U-shaped member have a rigidity greater than the continuous cord.

5. The system of claim 3, wherein the stem member extends between the head member and the cover member, and wherein the stem member is substantially cylindrically shaped with an internal channel corresponding to the continuous cord.

6. The system of claim 3, wherein the cover member is disposed between the stem member and the U-shaped member, and wherein the cover member includes a Y-shaped internal channel corresponding to the continuous cord.

7. The system of claim 6, wherein the continuous cord includes a twist such that the loop is oriented parallel to the lengthwise orientation of the at least one axle.

8. The system of claim 3, wherein the U-shaped member is disposed adjacent to the cover member and includes an internal channel corresponding to the continuous cord.

9. An active camming device system comprising:
   a head member comprising at least one axle and a rivet, wherein the rivet is physically independent from the at least one axle;
   a plurality of cam lobes rotatably coupled to the at least one axle, wherein the plurality of cam lobes are rotatable between an extended state and a retracted state with respect to the at least one axle, and wherein the cam lobes are spring biased toward the extended state;
   a retraction system configured to selectively engage the retracted state, wherein the retraction system includes fixably coupling the plurality of cam lobes with a trigger, and wherein the trigger is slidably externally coupled to the connection system; and
   a connection system configured to create an elongated partially rigid region by intercoupling the head member with a loop, wherein the connection system comprises a continuous cord wrapped around the head member and the loop, wherein the head member includes an internal region, and wherein the continuous cord is wrapped around the rivet within the internal region, and wherein the continuous cord includes at least one spliced coupling between two regions of the continuous cord.

10. A method for manufacturing an active camming device system comprising the acts of:
    providing a head member comprising at least one axle and a rivet, wherein the rivet is physically independent from the at least one axle;
    providing a plurality of cam lobes rotatably coupled to the at least one axle, wherein the plurality of cam lobes are rotatable between an extended state and a retracted state with respect to the at least one axle, and wherein the cam lobes are spring biased toward the extended state;
    providing a retraction system configured to selectively engage the retracted state, wherein the retraction system includes fixably coupling the plurality of cam lobes with a trigger, and wherein the trigger is slidably externally coupled to the connection system;
    providing a connection system configured to create an elongated partially rigid region by intercoupling the head member with a loop;
    wrapping a cord directly around the rivet but not the at least one axle of the head member; wherein the elongated partially rigid region includes a rigidity greater than the cord;
    extending the cord through a stem member to form the elongated partially rigid region;
    extending the through a U-shaped member to form the loop; and
    splicing two regions of the cord to form the loop.

11. The method of claim 10, wherein the act of splicing two region of the cord includes braiding a set of fibers of each of the two regions with one another.

12. The method of claim 10, wherein the act of extending the cord through stem member includes extending two separate regions of the cord through an internal region of the stem member.

13. The method of claim 10, further includes extending the cord through a cover member disposed between the stem member and the U-shaped member.

14. The method of claim 13, wherein the cover member includes a Y-shaped internal channel through which a set of separate regions of the cord are extended.

15. The system of claim 10, wherein the act of extending the cord through the U-shaped member includes extending a continuous region of the cord through an internal channel of the U-shaped member.

\* \* \* \* \*